United States Patent [19]

MacDougall

[11] Patent Number: 5,123,094

[45] Date of Patent: Jun. 16, 1992

[54] INTERPROCESSOR COMMUNICATIONS INCLUDES SECOND CPU DESIGNATING MEMORY LOCATIONS ASSIGNED TO FIRST CPU AND WRITING THEIR ADDRESSES INTO REGISTERS

[75] Inventor: Myron H. MacDougall, Sunnyvale, Calif.

[73] Assignee: Apple Computer, Inc., Cupertino, Calif.

[21] Appl. No.: 471,093

[22] Filed: Jan. 26, 1990

[51] Int. Cl.⁵ .............................................. G06F 9/46
[52] U.S. Cl. ............................ 395/375; 364/DIG. 1; 364/228.1; 364/228.3; 364/241.2; 364/247; 364/243; 364/246
[58] Field of Search ... 364/200 MS File, 900 MS File

[56] References Cited

U.S. PATENT DOCUMENTS

| | | | |
|---|---|---|---|
| 4,136,386 | 1/1979 | Annunziata et al. | 364/200 |
| 4,577,274 | 3/1986 | Ho et al. | 364/200 |
| 4,591,982 | 5/1986 | Buonomo et al. | 364/200 |
| 4,669,043 | 5/1987 | Kaplinsky | 364/200 |
| 4,785,398 | 11/1988 | Joyce et al. | 364/200 |
| 4,807,116 | 2/1989 | Katzman et al. | 364/200 |
| 4,853,846 | 8/1989 | Johnson et al. | 364/200 |
| 4,870,704 | 9/1989 | Matelan et al. | 364/200 |
| 4,905,219 | 2/1990 | Barr et al. | 370/4 |
| 4,933,835 | 6/1990 | Sachs et al. | 364/200 |
| 4,945,512 | 7/1990 | DeKarske et al. | 365/49 |
| 4,965,718 | 10/1990 | George et al. | 364/200 |

*Primary Examiner*—Thomas C. Lee
*Assistant Examiner*—Mehmet Geckil
*Attorney, Agent, or Firm*—Blakely, Sokoloff, Taylor & Zafman

[57] ABSTRACT

A method for performing inter-processor communications in a multiprocessor system combines the sending of a message with the sending of a message interrupt. Messages are exchanged through a shared memory organized into pages, each of which may be "owned" by a processor. When a sending processor executes a store instruction that stores its operand to a memory area owned by a destination processor, a message interrupt is presented to the destination processor. If the destination processor is interrupt enabled, the operand of the store instruction is stored at the address specified by the store instruction and that address is stored in a register of the destination processor. Execution of the store instruction by the sending processor then completes.

5 Claims, 3 Drawing Sheets

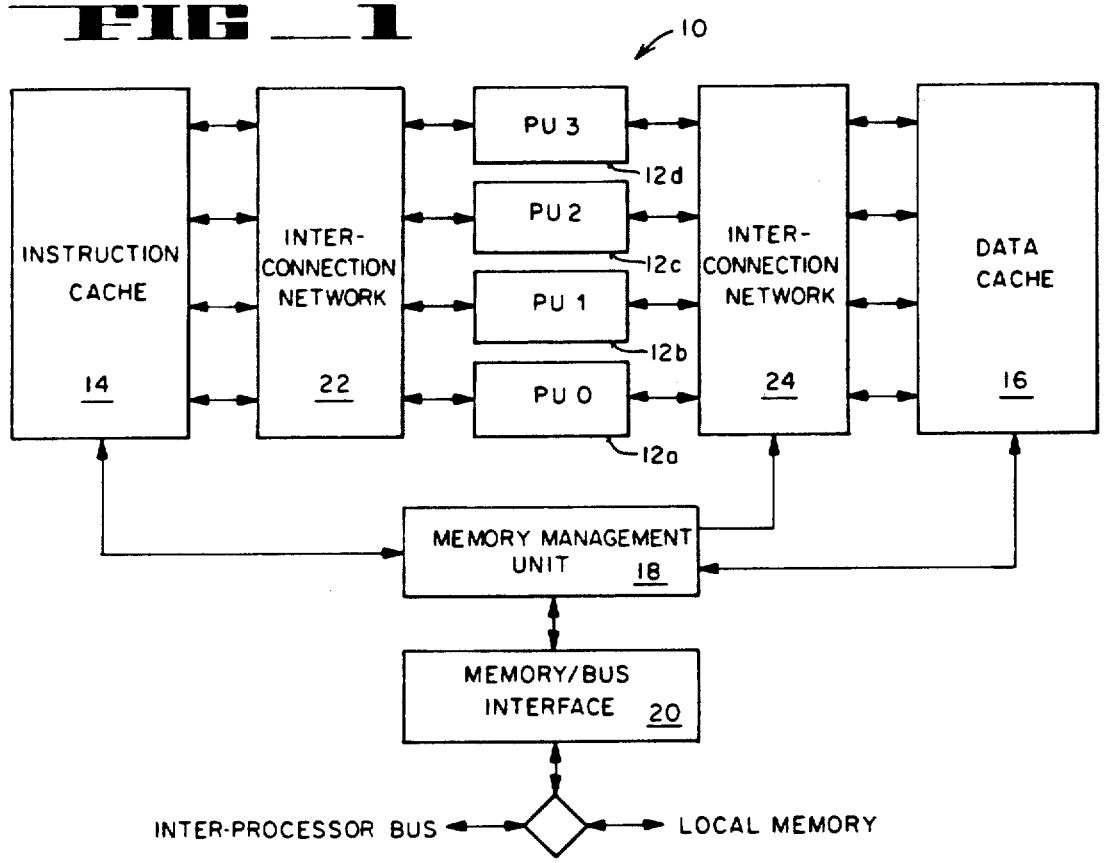
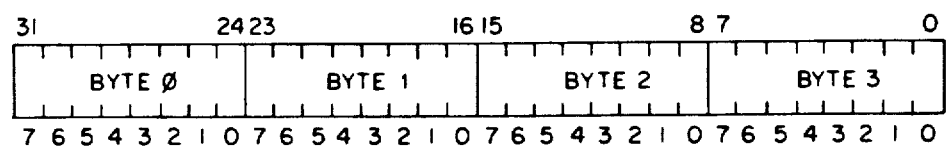
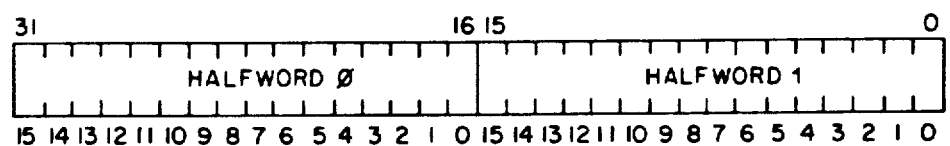
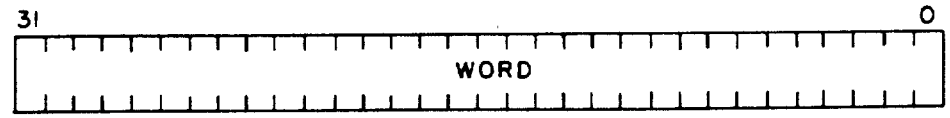

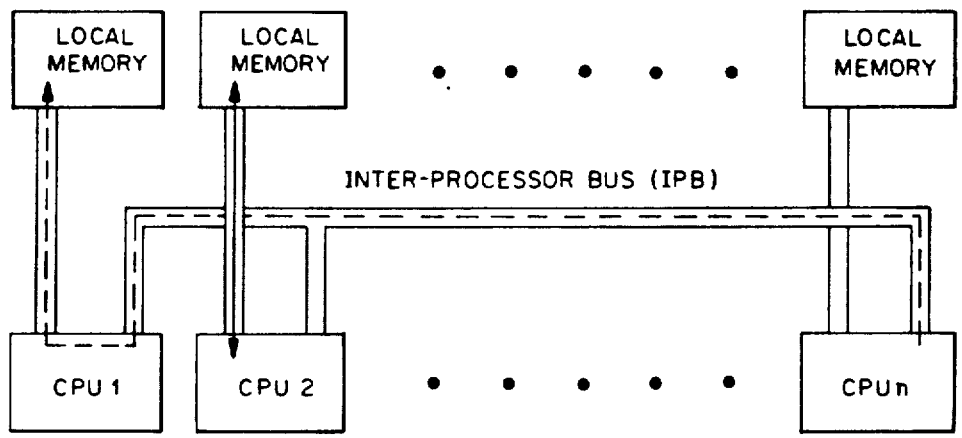
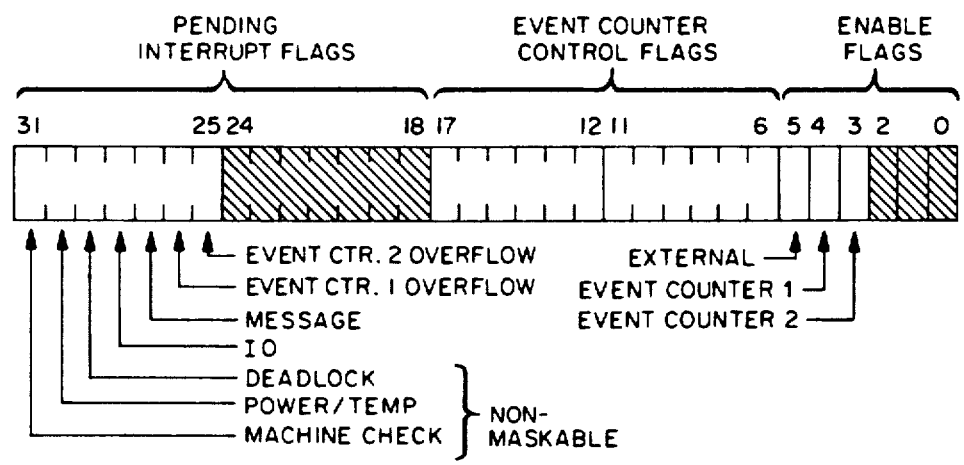
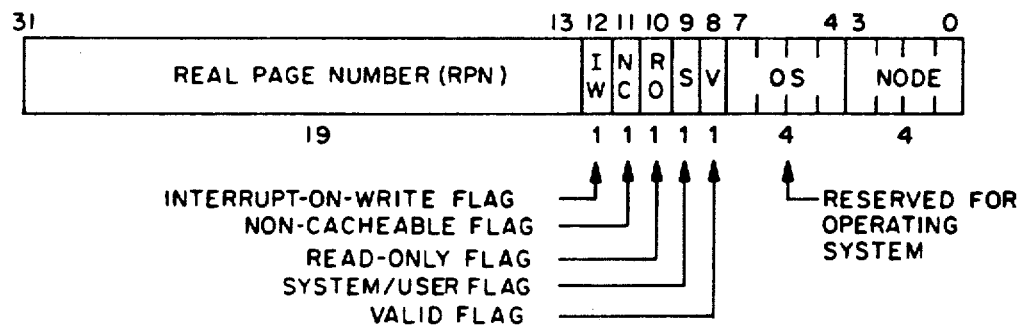

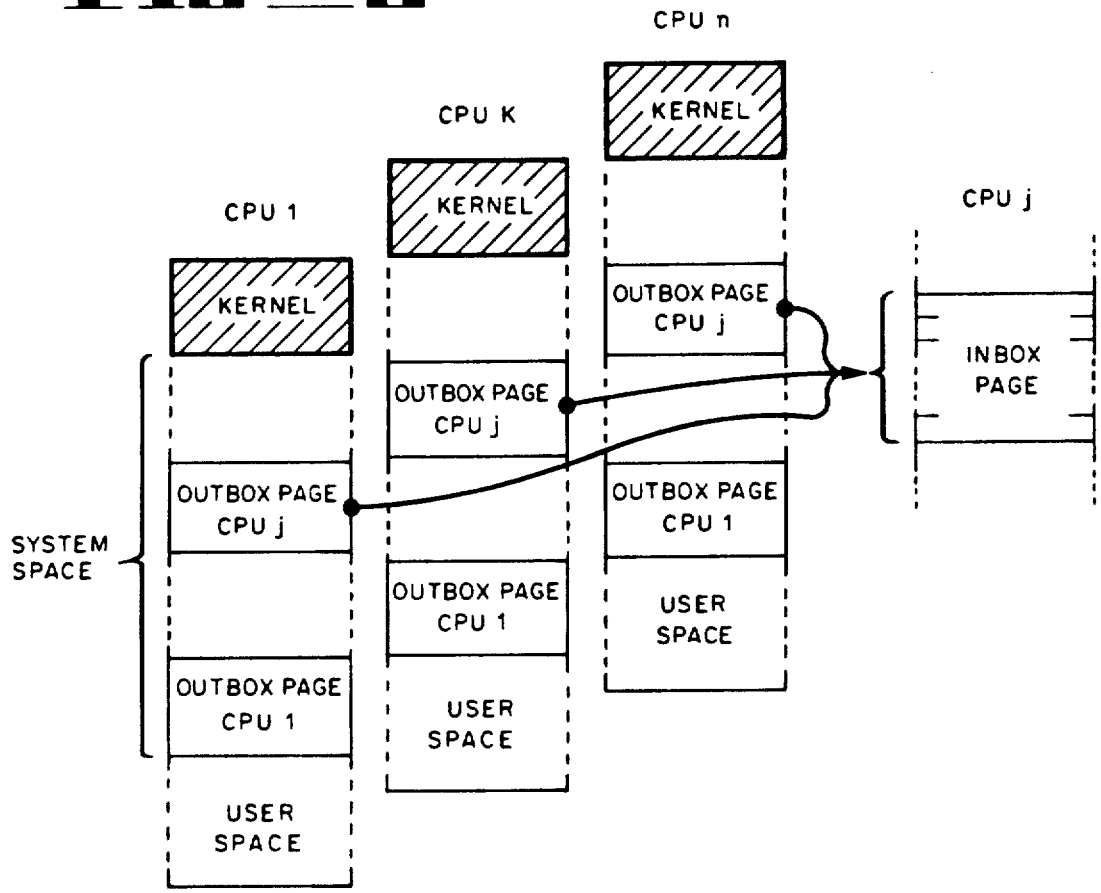
FIG_6
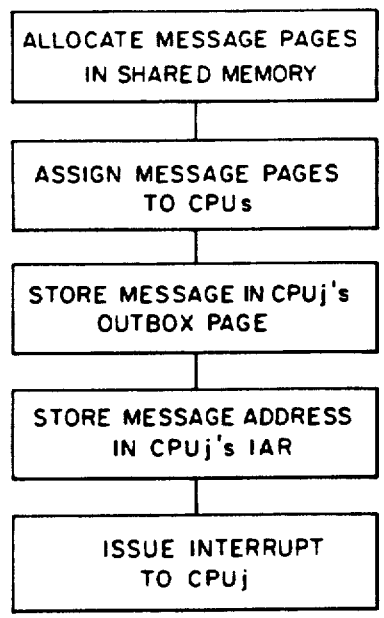
FIG_7

INTERPROCESSOR COMMUNICATIONS INCLUDES SECOND CPU DESIGNATING MEMORY LOCATIONS ASSIGNED TO FIRST CPU AND WRITING THEIR ADDRESSES INTO REGISTERS

BACKGROUND OF THE INVENTION

1. Field of the Invention

This invention relates to the field of data processing devices, and more particularly to a method for facilitating inter-processor communications in a multiprocessing environment.

2. Background Art

Data processing systems adapted for high levels of data throughput and/or for processing large arrays of data typically employ parallel processing to enhance performance. Such systems are commonly built around an array of independent but mutually interconnected processing units. In some systems, a supervisory processor is used to control the operation of all other processors, however, this approach involves significant hardware and processing overhead.

An alternative approach is to eliminate the supervisor and have each processing unit capable of autonomous operation. Supervisory control is thereby accomplished within an operating system common to all of the processors. This approach requires a network of inter-processor communications such that the activities of each processor may be controlled by the operating system and synchronized, when required, with activities of other processors.

Prior art multiprocessor systems have only limited interprocessor communication capabilities. Most prior art systems employ a shared memory through which data may be exchanged by memory operations such as a read-modify-write sequence. Control functions may be effectuated in a similar manner by causing one processor to write to a control word location in shared memory, which location is subsequently read by another processor. Local copies of the shared memory space (or portions thereof) may be maintained by the individual processors. For example, the HEP processor of Denelcor utilizes a form of shared memory communications in which each shared memory location includes a lock bit for controlling access.

Shared memory multiprocessors typically communicate control information via messages sent through shared communication areas in memory. When one processor wishes to send a message to another, it first obtains exclusive access to a predetermined communication area. Exclusive access is obtained either by prior allocation of communication areas or by the use of locks provided by the operating system and implemented via indivisible operation provided by the processor's instruction set (e.g., test-and-set). Once the message has been written to the communication area, the sending processor uses a second mechanism to inform the receiving processor that data has been sent. In some cases, the message simply is left in the communication area, to be read by the receiving processor when it does a periodic poll of its communication areas. In other cases, the sending processor sends a message interrupt to the receiving processor via the bus interconnecting the processors. The receiving processor, upon recognizing the interrupt, processes the incoming message. Message and message interrupt sending typically are operating system functions.

Certain prior art multiprocessor systems have provided an interrupt in the event that a predefined physical address is the target of a memory write operation. However, no information is exchanged between processors in such prior art systems. For example, the IEEE Standard for a Simple 32-bit Backplane Bus, also referred to as NuBus, ANSI/IEEE Std. 1196-1987, provides an interrupt that may be generated by a bus master to interrupt another (slave) module upon performing an event transaction into an area of the address space that is being monitored by the slave module. However, there is no provision for a transfer of information from the bus master to the slave module in conjuction with such an interrupt.

SUMMARY OF THE INVENTION

The present invention provides a method for performing interprocessor communications in a multiprocessor system. An interrupt is provided to a destination processor upon certain memory write operations.

The interrupt-on-write mechanism of the present invention combines the sending of a message with the sending of a message interrupt. Messages are exchanged through a shared memory organized into pages. Memory allocation is controlled by a page table. In addition to address translation and privilege information, a page table entry includes the number of the processor which "owns" a page, an interrupt-on-write flag, and a non-cacheable flag. Pages marked "interrupt-on-write" are also marked "non-cacheable". When a processor executes a store instruction which stores its operand to a memory area mapped by an interrupt-on-write page, a message interrupt is presented to the processor which owns the page, called the destination processor. If that processor is interrupt enabled, the operand of the store instruction is stored at the address specified by the store instruction. That address is stored in an Interrupt Argument Register of the destination processor, and the destination processor is interrupted. Execution of the store instruction by the sending processor then completes. If the destination processor is disabled for interrupts, the interrupt-on-write operation is either rejected or queued, depending on implementation.

The interrupt-on-write mechanism of the present invention permits using various different schemes for inter-processor communication. By appropriate allocation of pages, a multiprocessor system can establish a set of inter-processor message areas. To send a message, a processor simply executes a store instruction; completion of the store instruction indicates receipt of the message. The sending processor does not have to issue an operating system call to send a message although operating system intervention may be required by the destination processor to handle the message interrupt.

BRIEF DESCRIPTION OF THE DRAWINGS

FIG. 1 is a functional block diagram of a central processing unit (CPU) suitable for implementing the present invention.

FIGS. 2A, 2B, 2C illustrate the bit and byte structure of data words in the CPU of FIG. 1.

FIG. 3 illustrates a multi-CPU system constructed with CPUs as shown in FIG. 1.

FIG. 4 illustrates the bit organization of an Interrupt Control Register as employed by the present invention.

FIG. 5 illustrates a memory page table entry format employed by the present invention.

FIG. 6 illustrates a memory mapping technique for providing interCPU communications.

FIG. 7 is a functional flow diagram of the message transfer method of the present invention.

NOTATION AND NOMENCLATURE

The detailed description which follows is presented largely in terms of algorithms and symbolic representations of operations on data bits within a computational device. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities. Further, the manipulations performed are also referred to in terms, such as adding or comparing, which are commonly associated with mental operations performed by a human operator. No such capability of a human operator is necessary, or desirable in most cases, in any of the operations described herein which form part of the present invention; the operations are machine operations. While the present invention is most advantageously applied in a microprocessor, other useful machines for performing the operations of the present invention may include general purpose digital computers and similar devices. In all cases, the distinction between the method operations and operating a computer and the method of computation itself should be noted. The present invention relates, in part, to method steps for operating the processor and thereby process electrical signals to generate other desired electrical signals.

DETAILED DESCRIPTION OF THE INVENTION

In the following description, for purposes of explanation and not limitation, specific data representations, bit assignments, sequences of operation, etc. are set forth in order to provide a thorough understanding of the present invention. However, it will be apparent to one skilled in the art that the present invention may be practiced in other embodiments that depart from these specific details. In other instances, detailed descriptions of well known data processing devices, techniques and algorithms are omitted so as not to obscure the description of the present invention with unnecessary detail.

CPU Overview

In order to provide a thorough understanding of the present invention, an overview of a CPU in which the invention is preferably embodied will first be presented. Referring to FIG. 1, a CPU indicated generally as 10 comprises four independent processing units (PUs) 12a–d which share access to an instruction cache 14, a data cache 16, a Memory Management Unit (MMU) 18, and a Memory/Bus Interface 20. In addition to communicating through memory, PUs 12a–d can communicate and can coordinate their activities via broadcast instructions, which permit one PU to send data and addresses simultaneously to other PUs and to suspend its execution until other PUs complete execution of their activities. Multiple CPUs can be connected via an Interprocessor Bus (IPB) to form a multiprocessor system in which each CPU has its own local memory which it can share with other CPUs. Support for inter-CPU messaging is provided by interrupt-on-write pages as will be described below.

Each of the four identical and independent PUs 12a–d of CPU 10 is a 32-bit RISC (Reduced Instruction Set Computer). The four PUs access the instruction and data caches via interconnection networks 22 and 24. In addition to providing PU cache data transfer paths, these networks provide a direct inter-PU communication path for broadcast operations and global register access, as well as a path for interrupt routing. Instruction and data caches are divided into four banks, and each interconnection network includes a 5×4 crossbar switch, permitting simultaneous instruction and data accesses by all four PUs.

In one embodiment of CPU 10, a flat (unsegmented) virtual address space of 4096 megabytes (MB) is provided. A 4-megabyte area at the high end of each address space is reserved for the system kernel; the remaining 4092 megabytes, called user space, are available for the user and for other parts of the operating system. The kernel region is not paged, but instead maps directly to the first 4 megabytes of real memory. A single instance of the kernel, then, is common to all address spaces. User space is pageable. The standard page size is 8192 bytes (8 KB), but it is possible to define special frame buffer regions in which space is allocated in super-page units, which can range from 256 KB to 8 MB.

An address space is defined by a set of virtual-to-real page mappings which are recorded in a translation table. Each address space has its own translation table. At any instant, only one address space can be active on a CPU; the four PUs always execute in the same address space. A global register holds a pointer to the start of the translation table for the currently active address space. Translation tables have a simple, two-level structure, composed of a first-level directory and one or more second-level page tables. In addition to virtual-real mappings, translation table entries identify pages as system, read-only, non-cacheable, or interrupt-on-write.

Translation of virtual addresses to real addresses is done by the Memory Management Unit (MMU) using mappings obtained from translation table entries. To avoid reading directory and page table entries on every translation, the MMU maintains the most recently used mappings in a translation buffer. Virtually-addressed caches are preferred so that address translation is required only on a cache miss or on an access to a non-cached page. A 32-bit virtual address translates into a 36-bit real address, comprising a 4-bit node number and a 32-bit intra-node address. A node number identifies a position on the Inter-Processor Bus (IPB); the node at which a particular real page resides is said to be the owner of that page. On a cache miss or a non-cached memory access, the MMU sends a memory access request to the Memory/Bus Interface (MBI), which examines the node number of the real address accompanying the request. If the node number is the same as that of the CPU generating the request, then the request is directed to the local memory; otherwise, the request is sent to the specified node, or remote memory, via the IPB.

Pages (other than super-pages) can be marked "interrupt-on-write". As more fully described below, a store to an interrupt-on-write page causes a message interrupt to be presented to the node owning that page when the store is performed. The interrupt-on-write page can reside in either local or remote memory, and must also be non-cacheable. Interrupt-on-write pages provides a mechanism for transmitting messages between nodes and for coordinating activities of different nodes.

When CPU 10 receives a message interrupt or an external interrupt (such as an I/O interrupt), it examines the status of its four PUs. If one of the PUs is halted, it is assigned to process the interrupt. Only if all four PUs are busy is it necessary to actually interrupt PU execution. Interrupt processing, then, frequently can be done in parallel with application execution. Each PU has a flag which indicates if its state must be saved on interrupt. If a PU sets this flag prior to halting, state saving overhead on interrupt processing can be eliminated.

The PUs have a small register-oriented instruction set in which all data access to memory is done by register load and store instructions. Register and word size is 32 bits. Each PU 12a-d has 16 general-purpose registers, a total of 64 for CPU 10, and 7 local registers. Local registers include product, remainder, prefix, and various state saving registers. In addition, the four PUs share 8 global registers, including interrupt, event counter, and global status registers.

All instructions are 16 bits in length. There are two address modes: register, and base plus displacement. Base plus displacement addressing provides a displacement of up to 64 words from the base register address. However, prefixing can be used to increase the displacement range, transform register addressing into base plus displacement addressing (with any register as base), and provide signed displacements.

The 16-bit instruction length limits the size of immediate and displacement fields in the instructions. However, a large proportion of immediate and displacement values encountered in programs are small enough to be contained in these fields. When necessary, larger values can be created by prefixing the immediate or displacement field value. Each PU has a local register called the Prefix Register, whose state (empty or not empty) is represented by a Prefix Valid flag. Values are loaded into the Prefix Register by a Prefix instruction. If the Prefix Register is empty when a Prefix instruction is executed, the immediate field of the Prefix instruction is stored in the low-order bits of the Prefix Register and sign extended, and the Prefix Valid flag is set to not empty. If a second Prefix instruction is then executed, the contents of the Prefix Register are shifted left and the immediate field of the second Prefix instruction is stored in the low-order bits of the Prefix Register. When an instruction with a prefixable immediate or displacement is executed, the Prefix Valid flag is examined. If the Prefix Register is not empty, the contents of the Prefix Register are concatenated with the instruction's immediate or displacement field to form the effective immediate or displacement value. Prefixing also is used to define fields for field manipulation instructions.

The elements and organization of CPU 10 can be better understood in terms of a programming model comprising the elements of the CPU which are visible to a programmer (i.e., can be operated on by instructions). These elements include general registers, status register and program counter, special registers, and the instruction and data caches.

Various instructions operate on 32-bit full words, 16-bit half words, 8-bit bytes, and individual bits. Instructions themselves always are a half word in length. Only words and bytes can be directly loaded into a register from memory or stored to memory from a register. Arithmetic operations can be performed on words, half words, and bytes. As illustrated in FIG. 2, the 32 bits of a word are numbered right to left, from 0 to 31. Bit 0, the rightmost bit, is the least significant bit. Higher-numbered bits often are referred to as the high-order bits, and lower-numbered bits often are referred to as the low-order bits.

Half words and bytes within a word are positioned as shown in FIG. 2, which also shows bit ordering within half words and bytes. Byte 0 is the most significant (leftmost) byte, while byte 3 is the least significant (rightmost) byte.

In general, instructions and data are transferred between memory and CPU 10 in 64-byte (16-word) blocks called lines, which are stored in the instruction cache or data cache. The term "line" or "cache line" is used to refer to both a physical location in a cache and a block of 16 memory words which can be stored in that location. Instruction and data caches are architecturally visible, and instructions are provided to perform operations on cache lines including prefetch, invalidate, and flush.

Instruction and data addresses, 32 bits in length, spanning a virtual address space of 4096 megabytes. While all addresses are byte addresses, memory accesses for instructions and data are constrained to the appropriate boundaries. A half word boundary is a byte address with bit $<0> = $ "0", a word boundary is a byte address with bits $<1:0> = $ "00", and a line boundary is a byte address with bits $<5:0> = $ "000000". Instructions always must be aligned on a half word boundary; the low-order bit of an instruction address is ignored. Word operands always must be aligned on word boundaries; the low-order two bits of the operand address of a load or store word instruction are ignored. Cache lines, by definition, are aligned on cache line boundaries. Line transfers between the CPU and memory always are done on line boundaries. The low-order six bits of the operand address of a cache control instruction are ignored.

The programming model comprises a general register set, status register and program counters, a special register set, and the instruction and data caches. Each PU has its own general register set, status register, and program counters; these registers are said to be local to the PU. Each PU also has its own copy of certain special registers, while other special registers are common to all PUs; these are called global registers.

PUs execute in one of two modes; user mode or system mode. The current operating mode of a PU is determined by the setting of a flag in the PU Status/Control Register. Generally, applications execute in user mode, while the operating system kernel and other parts of the operating system execute in system mode. Execution in system mode confers certain privileges. Some special registers can be accessed only in system mode, certain instructions can be executed only in system mode, and pages marked "system only" can be accessed only in system mode.

Each PU has 16 32-bit general registers, numbered 0-15, so that there are 64 general registers for the CPU as a whole. General registers are generally interchangeable; any register can be used for any purpose. Any individual general register can be loaded from memory or have its contents stored to memory. From 1 to 15 registers can be loaded from memory or have their contents stored to memory via Load/Store Multiple instructions. A Load Byte instruction loads the addressed byte, right-justified with zero fill, into a general register. A Store Byte instruction stores the rightmost byte of a general register to memory.

There are two program counters (PCs), called the Current PC and the Next PC. Current PC holds the address of the currently-executing instruction. Next PC holds the address of the next instruction to be executed. Two program counters are required because of delayed branching. On a taken branch or jump, Current PC holds the address of the branch shadow instruction, and the branch target address is stored in Next PC. For sequential code, the address in Next PC usually is equal to the address in Current PC plus 2. Instructions must start on half word boundaries, so program counter bit <0> always is "0".

The contents of Current PC can be read by executing a Load Program Counter instruction, which loads the address in the Current PC, plus 2, into a general register. In addition to the normal incrementing which takes place in execution of sequential code, program counters are modified when a taken branch or jump instruction is executed, or when a return from interrupt takes place. When an interrupt or a trap is recognized by an interrupt/trap enabled PU, the contents of the Current and Next PCs are saved in a special register pair called the PC Save Queue; on return from interrupt, the contents of the PC Save Queue are transferred to Current PC and Next PC.

Inter-CPU Messaging

The system of FIG. 1 can be extended into a multi-CPU system by connecting additional CPUs to the Inter-Processor Bus (IPB) as shown in FIG. 3. Each CPU has its own local memory and IPB interface. Any one of the CPUs can communicate with another CPU's local memory via the IPB as shown by the dashed arrow in FIG. 3. As described above, a virtual address translates into a real address comprising a node number and an intra-node address, so that any CPU in a multi-CPU system can share pages with any other CPU in that system. However, the system organization is different from that of a conventional shared memory multiprocessor in which all processors access the same real memory.

In a conventional shared memory multiprocessor, all processors compete for a memory access (often by competing for a memory bus), and all memory accesses have the same expected delay. However, in the multi-CPU system as described herein, access to local memory is independent of the IPB as shown by the solid arrow in FIG. 3, and is therefore not delayed by IPB activity involving other CPUs. Also, depending on implementation, IPB transfers may have greater latency and possibly a lower transfer rate than local memory transfers so that, even in the absence of conflicts, an IPB transfer may take longer than a local memory transfer. Thus, frequently-accessed pages should be located in local memory. Depending on the number of accesses to a shared page, it can be more efficient to copy it from remote memory to local memory before accessing it rather than to access it over the IPB.

In accordance with the present invention, inter-CPU communication is based on interrupt-on-write pages. Various message passing schemes can be implemented using interrupt-on-write. Furthermore, interrupt-on-write provides a mechanism for synchronization of multiple CPUs. A store access to an interrupt-on-write page causes a Message Interrupt to be presented to the owner of that page by the MMU, as described below. This privilege is available only for user region pages. Access privileges for a page are established by setting the appropriate flags in the translation table entry for that page.

An attempted store to an interrupt-on-write page by a store word instruction causes a Message Interrupt to be presented to the processor owning that page, called the destination processor, or simply destination. The destination usually, but not necessarily, is a different processor than the processor in which the store instruction is executed. If that interrupt can be accepted by the destination processor, the message word is stored in the destination's local memory, and the address of the word referenced as the operand of the store instruction is stored in the Interrupt Argument Register (IAR) of the destination processor. If the destination processor has external interrupt presentation disabled, or if a Message Interrupt already is pending at the destination, the newly-presented Message Interrupt is rejected and the message word is not stored. Rejection of a Message Interrupt causes a Message Reject trap to be generated on the PU attempting to execute the store instruction, unless that PU is interrupt/trap disabled. In the latter case, a PU Check trap, rather than a Message Reject trap, is generated. (Consequently, a PU should send a message, i.e., store to an interrupt-on-write page, only while interrupt/trap enabled.)

The Interrupt Argument Register is a privileged global register which holds the argument associated with a pending message interrupt. Referring to FIG. 4, when a message interrupt arrives, the hardware interrupt handler first examines the external interrupt mask (bit 5) in the Interrupt Control Register (ICR). If this bit is "0", the interrupt is rejected. Otherwise, the Message Interrupt Pending flag (bit 27) is examined; if this flag is "0", it is set to "1", and the real byte address of the message destination is stored in the IAR (with the two low-order bits cleared to "0"). If the message interrupt finds the Message Interrupt Pending flag set to "1", it is rejected, as discussed earlier. In processing a Message Interrupt, the kernel must save the contents of the IAR before clearing the Message Interrupt Pending flag in the ICR.

The kernel decides how to deal with rejected messages. In a small configuration, it may simply reinitiate execution of the store instruction. In a large configuration, it may use some adaptive (e.g., backoff) algorithm to determine when another attempt to send a message should be made.

A page marked interrupt-on-write must also be marked non-cacheable. If it is not, a data page fault trap is generated when any access to the page results in an address translation which must read the corresponding translation table entry. The requirement that the interrupt-on-write page also be non-cacheable is one of the reasons for inhibiting store byte access to an interrupt-on-write page. Alternatively, interrupt-on-write may be made cacheable, as well as non-cacheable, so that message lengths of a line (64 bytes) can be accommodated. To do this safely will require the capability to lock a line into the cache to prevent inadvertent move-out of an incomplete message.

As thus far described, interrupt-on-write pages provide the basic mechanism for transmitting messages between CPUs. An interrupt-on-write tag bit in the page table is set to specify that a non-cached store to a remote CPU is to be accompanied by an interrupt. The operating system allocates n pages, where n is the number of CPUs in the system, for message sending. Each CPU, then, has a set of system pages which are common to all its address spaces; the virtual address of each page in this set maps into a real address of one of the other CPUs in the system. This mapping is not defined by the hardware architecture, but is left to the operating system.

The use of non-cacheable pages in conjunction with the interrupt-on-write tag bit for messaging means that the MMU does not have to perform an address comparison to determine if an IPB transfer falls within an address range that is defined as a message range and so require generation of an interrupt.

As an example, a possible mapping is shown in FIG. 6 and corresponding steps for a message transfer are shown in FIG. 7. The virtual page in an address space of CPU i into which that CPU writes to send a message to CPU j is called the outbox page for CPU j. This outbox page for CPU j maps into a real memory address in CPU j's memory called the inbox page. CPU i's page table entry for this page has the system, non-cacheable, and interrupt-on-write bit sets. CPU i sends a message to CPU j by writing a word containing the message operation code to word address address $\beta^*i$ in the outbox page for CPU j, where $\beta$ is a constant determined by the operating system. The MMU performs the address translation and initiates an IPB transfer with interrupt. The interrupt is presented to CPU j, the receiving CPU, after the message word has been stored in CPU j's memory. CPU j becomes disabled on recognition of the interrupt. CPU j's kernel retrieves the message address from the Interrupt Argument Register, removes the message from the inbox, and sends an acknowledgement to CPU i. In this scheme, every CPU in an n-CPU system has n−1 outbox pages and one inbox page; every outbox for CPU j maps to the same real page in j's memory.

If CPU i sends a message to CPU j and CPU j is disabled for interrupts, CPU j's MMU will perform the write operation and queue the interrupt until the CPU enables interrupts and the message interrupt can be recognized. Only one message interrupt can be queued; if some other CPU, say CPU k, attempts to send a message to CPU j while CPU j has a queued message interrupt, CPU k's message will be rejected. This rejection is effected via a synchronous negative response to CPU k's IPB transfer; it blocks completion of the instruction which initiated the message, and it causes a "message rejected" trap to be generated in CPU k.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. In a data processing system having a plurality of central processing units (CPUs) and a shared memory accessible by each of the CPUs, said shared memory controlled by a memory management unit (MMU), a method of communicating between a first CPU and a second CPU comprising the steps of:
   (a) dividing the shared memory into a plurality of pages;
   (b) assigning certain ones of the plurality of memory pages to corresponding ones of the CPUs;
   (c) executing a memory storage instruction in the second CPU, said memory storage instruction designating as a storage destination a memory storage location on a memory page assigned to the first CPU;
   (d) storing in an internal register of the first CPU an address of said memory storage location;
   (e) issuing an interrupt from the MMU to the first CPU; wherein the step of storing the address of the memory storage location is performed only if the first CPU is in an interrupt enabled condition.

2. The method of claim 1 wherein said shared memory includes a translation table for marking assignments of said memory pages to corresponding ones of the CPUs.

3. The method of claim 2 wherein said translation table includes a binary tag bit for each of said memory pages and wherein said interrupt is presented to the first CPU if and only if said tag bit for said memory page assigned to the first CPU is set to a selected binary value.

4. The method of claim 1 further comprising the step of sending an acknowledgement to the second CPU when the first CPU processes said interrupt.

5. The method of claim 4 further comprising the step of trapping the second CPU if the first CPU is not able to process said interrupt.

* * * * *